# UNITED STATES PATENT OFFICE.

FRIEDRICH KRECKE AND IGNAZ ROSENBERG, OF BIEBRICH, GERMANY, ASSIGNORS TO KALLE & CO., OF SAME PLACE.

AMIDONAPHTHOLDISULFO-ACID K.

SPECIFICATION forming part of Letters Patent No. 563,382, dated July 7, 1896.

Application filed December 30, 1895. Serial No. 573,812. (Specimens.) Patented in England January 9, 1894, No. 515.

*To all whom it may concern:*

Be it known that we, FRIEDRICH KRECKE and IGNAZ ROSENBERG, doctors of philosophy, residing at Biebrich-on-the-Rhine, Germany, have invented new and useful Improvements in the Manufacture of an Amidonaphtholdisulfo-Acid, (for which we have obtained Letters Patent in England, No. 515, dated January 9, 1894,) of which the following is a specification.

This invention relates to the manufacture of a new amidonaphtholdisulfo-acid—the 1.8.4.6. amidonaphtholdisulfo-acid—which forms valuable azo dyes for cotton and wool when treated in various manners with diazo and tetrazo bodies.

In order to prepare this new naphthalene derivative we proceed as follows: We stir ten parts of 1.5. naphthalene disulfonate of sodium into forty parts of sulfuric monohydrate, add nine parts of fuming sulfuric acid containing seventy per cent. $SO_3$ at a temperature not above 40° centigrade, and heat the mixture in a water-bath to temperatures between 80° and 90° centigrade, until all the disulfonate is dissolved and a test portion diluted with water shows no precipitate on addition of common salt. This sulfonation melt containing the 1.3.5. naphthalenetrisulfo-acid is then cooled and nitrified with 3.3 parts nitric acid containing seventy per cent. $HNO_3$ at a temperature not above 60° centigrade. After some hours' agitation at this temperature the nitration is finished. Now we stir the whole mass into five times its weight of water and reduce the formed 1.4.6.8. nitronaphthalenetrisulfo-acid by addition of iron-filings. Then we neutralize with lime, filter off the calcium sulfate, convert the calcium salt into the sodium salt, and acidify the solution with hydrochloric acid. On cooling, the acid sodium salt of the naphthylamintrisulfo-acid crystallizes out in fine white needles. This precipitate is heated in an autoclave, which is fitted with an agitator, with twice its weight of caustic-soda lye of 50° Baumé for ten to twelve hours up to temperatures between 160° and 170° centigrade. The produced alkaline liquid is acidulated with muriatic acid. The acid sodium salt of the 1.8.4.6. amidonaphtholdisulfo-acid separates on cooling, is filtered off and pressed. In this state it can directly be used for color-making. The above-described melting process with caustic soda can also be performed in an open vessel.

The so-produced new amidonaphtholdisulfo-acid which we call "K" acid differs from the 1.8.3.6 amidonaphtholdisulfo-acid called "H" acid in many ways. First, it is produced in a different manner, and, besides, it shows different properties. It is much easier soluble in water and gives on the whole azo colors which are more reddish in shade than those prepared with H acid. Perhaps in consequence of its greater solubility in water, perhaps on account of its different constitution, our K acid reacts much quicker in acid solution with diazo bodies than the H acid. The colors made with K acid can on the whole be salted out much easier, have greater inclination to crystallize, and dye shades of greater depth than those made with H acid.

The 1.8.4.6. naphthylamintrisulfo-acid, from which our K acid is made by treatment with caustic soda at high temperatures, forms with nitrous acid a diazo body, which cannot be precipitated from its aqueous solutions by addition of common salt; while the diazo compound of the 1.8.3.6. naphthylamintrisulfo-acid, from which the H acid is derived, can be easily salted out.

From our new 1.8.4.6. amidonaphtholdisulfo-acid four classes of azo colors can be made.

First. Primary azo colors which are made by acting on K acid with a molecular proportion of a diazo body. As an example we give the combination of diazo benzene with K acid, which dyes a bright red on wool from an acid bath.

Second. Disazo colors which are made by combining one molecule of K acid with one molecule of a diazo body in acid solution and acting on the so-formed intermediate body with another molecule of a diazo body in alkaline solution. Example: The combination of K acid with diazo benzylsulfo-acid and paranitrodiazo-benzene, which dyes a dark greenish blue on wool.

Third. Tetrazo colors which are made by acting with two molecules of K acid on one molecule of a tetrazo body. Example: The combination of tetrazo-diphenyl with two molecular proportions of K acid, which dyes a bright violet blue on unmordanted cotton.

Fourth. Mixed tetrazo colors which are made by acting with one molecule of K acid on intermediate combinations of one molecule of a tetrazo body with one molecule of an aromatic amin or a phenol or sulfo or carbo acids of such compounds or by acting on combinations of one molecule of K acid and one molecule of a tetrazo body with an aromatic amin or phenol or sulfo or carbo acids thereof. Example: The combination of tetrazo-dimethoxydiphenyl with one molecular proportion of K acid and one of H acid, which dyes a pure greenish blue on unmordanted cotton.

What we claim is—

1. The process of making 1.8.4.6 amido-naphtholdisulfo-acid, which consists in sulfonating 1.5 naphthalenedisulfo-acid with fuming sulfuric acid at temperatures not above that which can be attained by heating on a water-bath; transforming the so-produced 1.3.5 naphthalenetrisulfo-acid by nitration and reduction into the 1.4.6.8 naphthylamintrisulfonic acid, the diazo derivative of which cannot be precipitated from its aqueous solutions by common salt, heating this naphthylamintrisulfo-acid with caustic-soda lye, and precipitating it as acid sodium salt from the alkaline liquid thus obtained by acidulation with muriatic acid.

2. As a new product, the 1.8.4.6 amido-naphtholdisulfo-acid K, which is readily soluble in water and gives azo colors which are more reddish in shade than those prepared with the H acid; it reacts much more readily in acid solution with diazo bodies; the colors made with the K acid are more readily salted out, have greater tendency to crystallize, and dye shades of greater depth than those made with the H acid.

In testimony whereof we have signed our names to this specification in the presence of two subscribing witnesses.

FRIEDRICH KRECKE.
IGNAZ ROSENBERG.

Witnesses:
ROBERT DORFELDER.
CARL ED. HAHN.